United States Patent
Herron et al.

(10) Patent No.: US 8,354,025 B2
(45) Date of Patent: Jan. 15, 2013

(54) OSMOTIC PUMP FOR FORWARD OSMOSIS DEVICES

(75) Inventors: John R. Herron, Corvallis, OR (US); Edward Beaudry, Corvallis, OR (US)

(73) Assignee: Hydration Systems, LLC, Scottsdale, AZ (US)

( * ) Notice: Subject to any disclaimer, the term of this patent is extended or adjusted under 35 U.S.C. 154(b) by 0 days.

(21) Appl. No.: 12/794,795

(22) Filed: Jun. 7, 2010

(65) Prior Publication Data

US 2011/0081469 A1 Apr. 7, 2011

Related U.S. Application Data

(60) Provisional application No. 61/185,179, filed on Jun. 8, 2009.

(51) Int. Cl.
- *B01D 63/00* (2006.01)
- *B01D 63/12* (2006.01)
- *B01D 61/02* (2006.01)

(52) U.S. Cl. ......... 210/321.72; 210/321.76; 210/321.74; 210/652; 210/649

(58) Field of Classification Search .................. None
See application file for complete search history.

(56) References Cited

U.S. PATENT DOCUMENTS

| | | | |
|---|---|---|---|
| 4,033,878 A | 7/1977 | Foreman et al. | |
| 5,098,575 A * | 3/1992 | Yaeli | 210/652 |
| 5,151,093 A * | 9/1992 | Theeuwes et al. | 604/892.1 |
| 5,281,430 A * | 1/1994 | Herron et al. | 426/490 |
| 6,866,783 B2 * | 3/2005 | Baurmeister et al. | 210/649 |
| 7,727,400 B2 * | 6/2010 | Flynn | 210/652 |
| 8,021,549 B2 * | 9/2011 | Kirts | 210/257.2 |
| 8,246,791 B2 * | 8/2012 | McGinnis et al. | 203/25 |
| 2004/0004037 A1 * | 1/2004 | Herron | 210/321.83 |
| 2006/0144789 A1 * | 7/2006 | Cath et al. | 210/641 |

* cited by examiner

*Primary Examiner* — Krishnan S Menon
(74) *Attorney, Agent, or Firm* — Fennemore Craig, P.C.

(57) ABSTRACT

A self-regulating FO system is disclosed comprising a container containing a source water supply, a forward osmosis membrane element located within the container comprising an area of osmotic membranes, an osmotic agent inlet and a drink outlet, an osmotic pump element also located within the container comprising an area of osmotic membranes, an osmotic agent inlet and a drink outlet, and an osmotic agent tank located above the container. The osmotic agent tank comprises a feed tube connected to an outlet located on the bottom of the osmotic agent tank. The feed tube communicates with the osmotic agent inlet of the forward osmosis membrane unit and the osmotic agent inlet of the osmotic pump element. A return tube communicates with the drink outlet of the osmotic pump element and a port near the top of the osmotic agent tank.

20 Claims, 2 Drawing Sheets

OSMOTIC PUMP FOR FORWARD OSMOSIS DEVICES

CROSS-REFERENCE TO RELATED APPLICATION

This application claims priority to U.S. provisional application entitled "Osmotic Pump for Forward Osmosis Devices", Ser. No. 61/185,179, filed Jun. 8, 2009, the entire disclosure of which is hereby incorporated herein by reference.

BACKGROUND

1. Technical Field

This document relates to an osmotic pump for forward osmosis devices.

2. Background

Recently, water purifiers employing forward osmosis (FO) have been commercialized. In FO devices concentrated nutrient syrup or powder is contacted to one side of a semipermeable membrane and dirty or salty water is contacted to the other side. The membranes have a molecular selectivity similar to reverse osmosis membranes, which allow water to pass but effectively block dissolved salts, sugars, and contaminants, as well as biologicals such as viruses, bacteria, cysts, pyrogens, and prions. Unlike the pressure driven reverse osmosis process, FO draws pure water from contaminated water by osmosis. No pumping is required; a concentrated nutrient solution passively pulls water across the membrane from the dirty water, creating a dilute drink which supplies needed calories, electrolytes and hydration in a remote location or during an emergency.

Commercial devices have two basic designs; batch or continuous production of drink. The batch designs use powder or syrup in a membrane bag. The bag must be allowed to hydrate in the source water until the desired amount of water has been absorbed after which the drink may be consumed.

Continuous production devices use membrane elements that have a large amount of membrane sealed so that: (1) there is a syrup inlet; (2) there are flow paths which bring the syrup into contact with one side of a membrane and source water into contact with the other side; (3) there is an exit for the dilute drink; and (4) there is a method for introducing syrup at a rate so that a desired dilution of the drink occurs in the element.

However, the methods for controlling syrup rates involve either highly complex and/or power-consuming control systems. In case of disaster areas or remote sites, such power sources may not be available and technically trained individuals may also not be available to support such FO-based drinking water systems.

A common application of the device introduces "sports drink" syrup at a concentration of 65% solids (35% water by weight) at a rate so that in the element the syrup absorbs from 15 to 50 times its volume in water. To keep the systems simple, inexpensive and avoid power consumption, in some devices the rate of syrup flow is controlled by either an IV drip device or by gravity flow through a capillary tube.

However, with these methods it is difficult to achieve a standard dilution because: (1) the rate of water transfer through the membrane is temperature dependent, such that water at cold temperatures is transferred more slowly than at warm temperatures; (2) the rate of water transfer is dependent on dissolved solids in the source water, such that dissolved solids in the dirty water slow water transfer; (3) the water transfer through the membrane declines over months of use; and (4) changes in syrup viscosity with temperature affect the syrup flow in a capillary tube.

The result is that such variables as temperature, dissolved solids in the source water, and age of the membranes all cause significant changes in the osmotic strength (such as nutrient or salt) of the resulting drink produced.

SUMMARY

Aspects of this document relate to an osmotic pump for forward osmosis (FO) devices and water treatment systems that, in the absence of power sources and a highly trained technician, can self-regulate syrup feeds without power pumps and sensors and without a skilled technician. These aspects may include, and implementations may include, one or more or all of the components and steps set forth in the appended CLAIMS, which are hereby incorporated by reference.

In one aspect, a self-regulating FO system is disclosed. The system may include a container containing a source water supply. Located within the container may be a forward osmosis membrane element comprising an area of osmotic membranes and an osmotic agent inlet and a drink outlet. An osmotic pump element may also be located within the container and may have an osmotic agent inlet and a drink outlet. The osmotic pump element may comprise an area of osmotic membranes wherein the total surface area of osmotic membrane is from about 1% to about 20% of the total surface area of membranes in the forward osmosis membrane element. An osmotic agent tank may be located above the container and may have a releasable top having a port thereof. The osmotic agent tank may further comprise a feed tube connected to an outlet located on the bottom of the osmotic agent tank. The feed tube may be further connected to a "T" connector that splits the feed tube into two branches. A first branch may communicate with the osmotic agent inlet of the forward osmosis membrane unit and a second branch may communicate with the osmotic agent inlet of the osmotic pump element, and a tube communicating with the drink outlet of the osmotic pump element.

Particular implementations may include one or more or all of the following.

The osmotic pump element may regulate osmotic agent flow rates into the forward osmosis membrane element by creating a density gradient within the osmotic agent tank.

The osmotic agent may be a syrup having a specific gravity of approximately 1.3.

The forward osmosis membrane element may be in the form of one or a plurality of spiral wound elements.

The osmotic pump element may be in the form of one or a plurality of spiral wound elements.

In another aspect, a process for controlling osmotic agent flow into a forward osmosis membrane element is disclosed so as to control for variability of operating temperature, source water quality and age of the forward osmosis membrane element. The process may include: (a) providing a self-regulating FO system as previously described; (b) adding components of an osmotic agent to the osmotic agent tank and source water to the container; and (c) obtaining a drink of consistent strength over varying ranges of temperature, source water quality and age of membranes.

Particular implementations may include one or more or all of the following.

The osmotic pump element may regulate osmotic agent flow rates into the forward osmosis membrane element by creating a density gradient within the osmotic agent tank.

The osmotic agent may be a syrup having a specific gravity of approximately 1.3.

The forward osmosis membrane element may be in the form of one or a plurality of spiral wound elements.

The osmotic pump element may be in the form of one or a plurality of spiral wound elements.

In another aspect, an osmotic pump element is disclosed located within a container of source water. The osmotic pump element may include an area of osmotic membranes wherein the total surface area of osmotic membrane is from about 1% to about 20% of the total surface area of membranes in a corresponding forward osmosis membrane element. The osmotic pump element may further comprise an osmotic agent inlet and a drink outlet. The forward osmotic pump element may be in the form of one or a plurality of spiral wound elements.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

This document features osmotic pump implementations for forward osmosis (FO) devices and water treatment systems that, in the absence of power sources and a highly trained technician, can self-regulate syrup feeds without power pumps and sensors and without a skilled technician. Thus, there are many features of osmotic pump implementations disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Osmotic Pump and FO System

The present disclosure provides an unpowered osmotic pump as a component of a FO water purification system that controls the syrup feed rate by feeding a small portion of the drink produced back to a syrup feed container.

Figure 2:
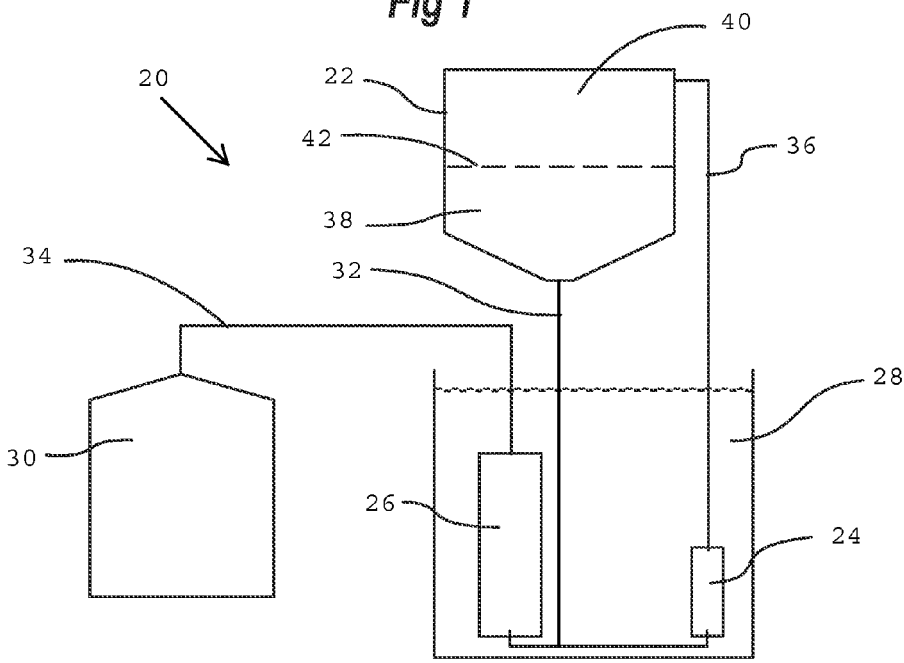
FIG. 2 is a schematic view of an implementation of an osmotic pump for forward osmosis (FO) devices and water treatment systems.

There are a variety of osmotic pump and self-regulating FO system implementations. Notwithstanding, turning to FIG. 2 and for the exemplary purposes of this disclosure, a schematic view of an implementation of an osmotic pump for FO devices and water treatment systems is shown. Generally, the osmotic agent may be a syrup and the self-regulating FO system may further contain a drink collection tank for the output of the forward osmosis membrane element. Both the forward osmosis membrane element and the osmotic pump element may be spiral wound elements.

Specifically, FO water purification system 20 may include five main elements in fluid communication with one another: (1) a syrup or osmotic agent tank 22; (2) a dirty or source water and container 28 located below the tank 22; (3) FO water filter element(s) 26 located within the container 28; (4) an osmotic pump filter element(s) 24 located within the container 28; and (5) a drink collection tank 30.

The syrup or osmotic agent container or tank 22 has a port on the bottom which communicates with the bottom of the osmotic pump element(s) 24 and with the bottom of the osmosis filtration element(s) 26 via a feed tube 32. The feed tube 32 may be connected to a "T" connector that splits the feed tube 32 into two branches. A first branch may communicate with the osmotic agent inlet of the forward osmosis membrane unit 26 and a second branch may communicate with the osmotic agent inlet of the osmotic pump element 24.

The top of the osmotic pump filter element(s) 24 also has a feed tube 36 communicating with the top of the syrup tank 22 so that the filtration element(s) 26 discharge dilute drink to the collection tank 30.

Osmotic agent 38 (e.g., syrup) delivery to the osmotic pump 24 occurs by natural convection. Because of its high density (syrup 38 may have a specific gravity of approximately 1.3), syrup 38 descends from the osmotic agent tank 22 to the bottom port of the osmotic pump element 24. Inside the osmotic pump element 24, the syrup 38 draws water across the pump's 24 osmotic membrane from the dirty source water 28. Dilute drink 40 exiting the osmotic pump 24 returns to the top of the osmotic agent tank 22 via return tube 36. The difference in density between the syrup 38 in feed line 32 to the osmotic membrane filter elements and osmotic pump, and the dilute drink 40 in the return line 36 induces flow through the osmotic membrane element 26.

Another consequence of the large difference in density between the syrup 38 and the dilute drink 40 fluid is that dilute drink 40 fluid returning to the syrup tank 22 forms a layer on top of the syrup 38 and does not mix; see fluid interface 42. Over time the syrup/dilute interface 42 moves down the syrup tank 22 as the return flow 40 from the osmotic pump 24 forces syrup 38 from the tank 22. When the syrup 38 is gone the system 20 is sanitized, drained and refilled with syrup 38.

Flow of syrup 38 in the osmotic filtration element(s) 26 is induced by the dirty water 28 being drawn across the membrane in the osmotic pump 24. The volume flow from the top of the pump 24 to the syrup tank 22 is far higher than the flow of syrup 38 to the bottom of the pump 24. Since the syrup tank 22 is closed, the increase in volume causes an equal volume of syrup 38 to be forced into the filtration element(s) 26.

The osmotic pump 24 allows the system 20 to deliver a relatively standard dilution because the same factors that affect the performance of the filter 26 membrane(s) (e.g., temperature, age, dissolved solids) also affect the osmotic pump 24 membrane(s). The production rate varies widely under different conditions but the sugar and flavor content of the drink remains nearly constant. The total surface area of osmotic membrane in pump 24 may be from about 1% to about 20% of the total surface area of membranes in the forward osmosis membrane element(s) 26.

The system 20 operates whereby syrup 38 is fed to the osmotic pump element(s) 24 by natural convection induced by a density gradient between the tube(s) 32 connecting the bottom of the osmotic agent tank 22 and the osmotic pump 24 inlet and the tube 36 connecting the outlet of the osmotic pump 24 and the port near the top of the osmotic agent tank 22. Further, the flow rate of syrup 38 to the osmotic filtration element(s) 26 is approximately equal to the rate of water 28 drawn through membrane of the osmotic pump element(s) 24.

Spiral Wound Element and Osmotic Pump Element

The forward osmosis membrane element 26 and the osmotic pump element 24 may be in the form of one or two or a plurality of spiral wound elements.

A spiral wound membrane design configuration is inexpensive and can provide one of the greatest membrane surface areas in a vessel per cost (it can have a high membrane density (about 30 m$^2$ per 20 cm diameter by 100 cm long element)).

In general, a spiral wound configuration, a permeate spacer, a feed spacer and two membranes can be wrapped around a perforated center tube and glued in place. The membranes are wound between the feed spacer and the permeate spacer. Feed fluid is forced to flow longitudinally through the module through the feed spacer, and fluid passing through the membranes flows inward in a spiral through the permeate spacer to the center tube. To prevent feed fluid from entering the permeate spacer, the two membranes are glued to each other along their edges with the permeate spacer captured between them. The feed spacer remains unglued. Module assemblies are wound up to a desired diameter and the outsides are sealed.

Figure 3:
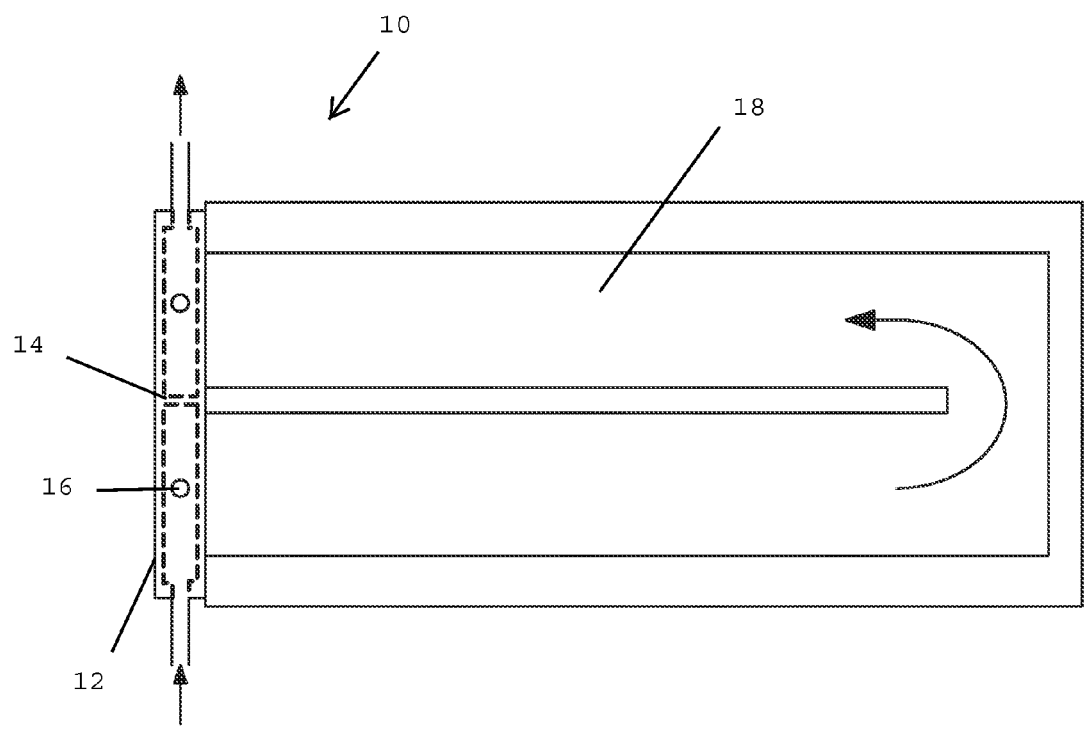
FIG. 3 is a broken away plan view of an unrolled spiral wound FO membrane element.

For the exemplary purposes of his disclosure, a spiral wound FO membrane element 10 is depicted in FIG. 3 as it would appear if it were unwound. This membrane element 10 forces a draw solution (i.e., osmotic agent (OA) or brine) to flow through the entire, single membrane envelope 18. Specifically, the concentrated OA is pumped into one end of a center tube 12 with perforations 16. A barrier element 14 fixed halfway down the tube 12 forces the OA fluid flow through the perforations 16 into the membrane envelope 18. A glue barrier is applied to the center of the membrane envelope 18 so that fluid must flow to the far end of the membrane where a gap allows it to cross over to the other side of the membrane envelope 18 then back into the second half of the center tube 12 and out of the element 10. While FIG. 3 shows a single envelope 18 in a flat configuration, in an actual element there may be multiple envelopes and, instead of being flat, they are wound/wrapped around the center tube 12 with feed fluid spacers between the envelopes. A similar FO element design was taught in U.S. Pat. No. 4,033,878 (the entire disclosure of which is hereby incorporated by reference herein).

Generally, in operation, multiple modules may be placed in a tubular housing and fluid may be pumped through them (e.g., in series or parallel). Thus, for example, the center tube 10 in FIG. 3 and in U.S. Pat. No. 4,033,878 have a single inlet and if elements 10 are stacked together, OA will travel through a first element 10 and then through a second element 10 in series for example.

To operate the spiral wound membrane element, nutrient powder or syrup 38 (osmotic agent) is introduced into an osmotic agent chamber 22 via a tube. The element operation is unhindered by highly turbid dirty water 26. Ambient or available water from a questionable source is used to fill the dirty water spacer through the openings, preferably located on either end. When the dirty water 28 is introduced, the osmotic agent 38, preferably in the form of a syrup, hydrates by osmotically pulling water from the dirty water 28 channel across the membrane.

Membranes

The membranes used in the forward osmosis element(s) and osmotic pump element(s) (in any configuration) may be hydrophilic, cellulose-ester based membranes with salt rejections in the 80% to 95% range when tested as reverse osmosis membrane (60 psi, 500 PPM NaCl, 10% recovery, 25° C.). The membranes may be asymmetric and may be formed by the immersion precipitation process. The membranes are either unbacked, or have a very open backing that does not impede water reaching the rejection layer, or are hydrophilic and easily wick water to the membrane. The nominal molecular weight cut-off of the membrane is 100 daltons.

EXAMPLE

An FO system was built with an osmotic pump with 1.5 m$^2$ of membrane. The FO filter elements contained 30 m$^2$ of membrane. Thus the membrane area of the FO element was 20× the area of the osmotic pump element. The syrup feed tank was a 20 liter closed container located 1.5 m above the bottom of the elements. Syrup was a 65% solids sports drink concentrate. The dirty water tank had a volume of 200 liters and was replenished by means of a float valve and hose from an elevated holding tank. The tube from the bottom of the syrup tank to the osmotic pump element and osmotic filtration elements was 9 mm in internal diameter (ID), while the tube from the top of the osmotic pump to the syrup tank was 6 mm ID. The osmotic pump was 0.3 m in length and consisted of a single membrane envelope 2.4 m in length. There were 6 osmotic filtration elements connected in parallel where each element was 0.5 m in length and possessed 4 membrane envelopes each 1.2 m in length.

Figure 1:
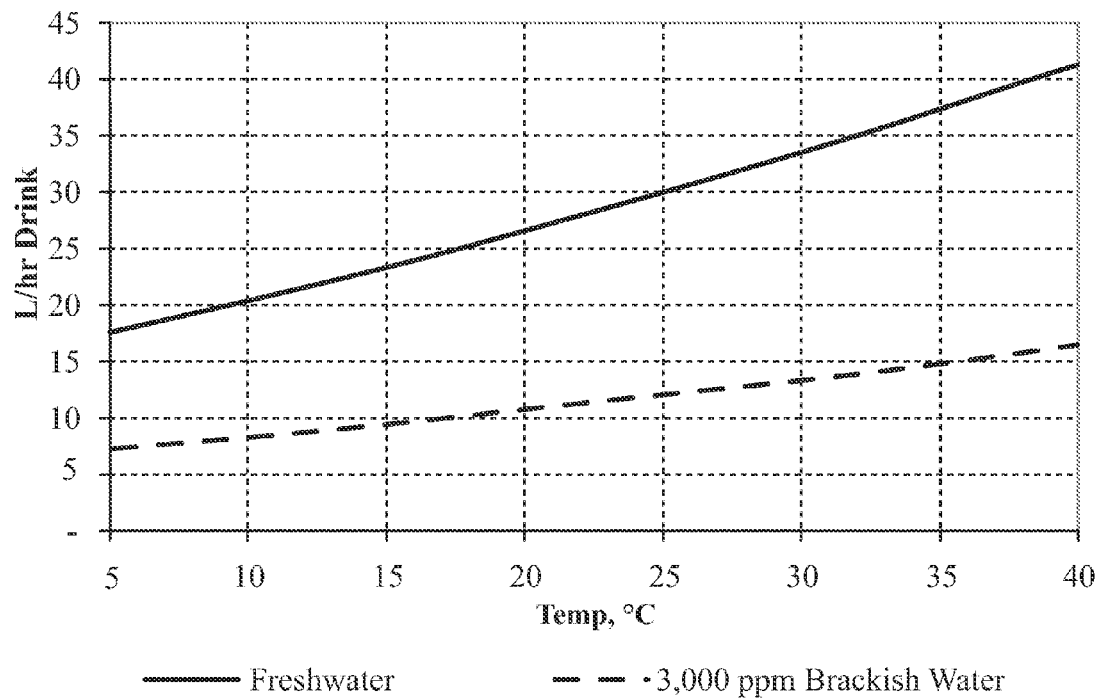
FIG. 1 is a graph of the rate of drink formation as a function of different temperatures and different source water.

Tests were run at various temperatures between 5 and 40° C. with dirty, fresh water and with brackish water with a salt content of 3.0 g/liter. Tests were carried out over 6 months and a plot of production with these feeds is shown in FIG. 1.

Other Implementations

Many additional implementations are possible.

For the exemplary purposes of this disclosure, although there are a variety of spiral wound membrane element implementations, a spiral wound FO membrane element as shown and described in U.S. application Ser. No. 12/720,633, filed on Mar. 9, 2010, entitled "Center Tube Configuration for a Multiple Spiral Wound Forward Osmosis Element", may be used, the entire disclosure of which is hereby incorporated herein by reference.

Thus, in summary, the spiral wound membrane element may be similar to element 10 as previously described, but may include an improved center tube instead of center tube 12.

The perforated spiral wound membrane center tube may include at least two perforations (e.g., a plurality) through its wall (e.g., a cylindrical wall) that are in fluid communication with two internal chambers, an upstream chamber and a downstream chamber, separated from each other by a barrier element. The barrier element may be located at about the midpoint of the center tube. Sealable barrier elements are located at each open end of center tube respectively and may each comprise a sealable stab and a stab receptacle. Barrier elements all include barrier penetrations.

Perforated spiral wound membrane center tube may comprise at least one internal small diameter (smaller in diameter than the center tube 10) non-perforated tube located substantially within the outer center tube. The at least one non-perforated tube extends the length of the downstream and/or the upstream chambers out through the barrier penetrations of the barriers so that the upstream chamber of a first center tube fluidly communicates with the upstream chamber of a neighboring center tube and so on and/or the downstream chamber of a first center tube fluidly communicates with the downstream chamber of a neighboring center tube and so on.

For the exemplary purposes of this disclosure, the at least one internal non-perforated tube may comprise two tubes. In particular, a feed bypass tube may be located substantially within the center tube and extends the length of the downstream chamber out through barriers. The feed bypass tube moves osmotic agent (OA) from the upstream chamber through the barrier and out of the center tube (to the next tube to the left side, not shown) without mixing it within the downstream chamber. Similarly, the downstream exit from an upstream element (located to the right of the center tube) feeds diluted OA through an exit bypass tube (located substantially within the center tube and extending the length of the upstream chamber out through barriers) into the downstream chamber without mixing it within the upstream chamber.

Accordingly, the spiral wound element includes a perforated center tube and a spiral wound membrane envelope (such as envelope 18), and having a feed solution communicating with the membrane envelope and a draw solution communicating with the center tube. The membrane envelope may include two rectangular sheets of membrane having seals on three sides to form an inner envelope chamber that fluidly communicates with the interior of the membrane center tube 10 through the plurality of perforations, and wherein a partial length barrier is provided within each membrane envelope to increase fluid flow paths. The upstream and downstream chambers may have a torturous interconnection path through the membrane envelope.

For the exemplary purposes of this disclosure, although there are a variety of spiral wound FO membrane system implementations, a spiral wound FO membrane system as shown and described in U.S. application Ser. No. 12/720,633, filed on Mar. 9, 2010, entitled "Center Tube Configuration for a Multiple Spiral Wound Forward Osmosis Element", may be used, the entire disclosure of which is hereby incorporated herein by reference.

Thus, in summary, spiral wound FO membrane system implementations allow the OA to flow through all elements in a housing in parallel. In general, the membrane system may include at least one element. For example, there may be a stack of at least two elements. For another example, there may be from about one to up to 100 elements (including membrane envelopes). The center tubes of the elements have barriers at the ends and at the midpoint, and each of these barriers is penetrated by two bypass pipes. One set of bypass pipes allows concentrated OA to be conveyed independently to the OA feed side of each element, while the second set of bypass pipes conveys the diluted OA out of the stack. This arrangement allows the elements to be nested together in a stack which has only a single OA and feed connection at each end, but yet provides the OA flow through each element in a parallel configuration.

Thus, a plurality of spiral wound elements are arranged end-to-end (and then usually within a cylindrical housing). Each of the plurality of spiral wound elements has a first, second and so on perforated center tube each having two open ends, and a plurality of spiral wound membrane envelopes, and each having a feed solution communicating with the membrane envelopes and a draw solution communicating with the center tubes. Each center tube has two chambers, an upstream chamber and a downstream chamber, separated from each other by a barrier element. The upstream and downstream chambers may have a torturous interconnection path through the membrane envelopes. The upstream chamber of the first center tube communicates with the upstream chamber of a neighboring or subsequent center tube through a non-perforated bypass tube passing the first center tube, and the downstream chamber of the first center tube communicates with the downstream chamber of a neighboring center tube through a non-perforated bypass tube passing the first center tube. The center tubes and barriers form an inlet and an outlet manifold, such that all the upstream sections of the center tubes are connected together in parallel and all of the outlet downstream sections of the center tubes are connected together in parallel. The non-perforated bypass tubes passing the center tubes may be connected to sealable stabs and stab receptacles located at the open ends of each center tube.

Further implementations are within the CLAIMS.

Specifications, Materials, Manufacture, Assembly

It will be understood that implementations are not limited to the specific components disclosed herein, as virtually any components consistent with the intended operation of an osmotic pump and FO system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of an osmotic pump and FO system implementation. Implementations are not limited to uses of any specific components, provided that the components selected are consistent with the intended operation of an osmotic pump and FO system implementation.

Accordingly, the components defining any an osmotic pump and FO system implementation may be formed of any of many different types of materials or combinations thereof that can readily be formed into shaped objects provided that the components selected are consistent with the intended operation of an osmotic pump and FO system implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Acrylic, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination thereof.

For the exemplary purposes of this disclosure, the FO membrane may be made from a thin film composite RO membrane. Such membrane composites include, for example, a cellulose ester membrane cast by an immersion precipitation process on a porous support fabric such as woven or nonwoven nylon, polyester or polypropylene, or preferably, a cellulose ester membrane cast on a hydrophilic support such as cotton or paper. The RO membrane may be rolled using a commercial thin film composite, sea water desalination membrane. The membranes used for the FO element (in any configuration) may be hydrophilic, membranes with salt rejections in the 80% to 95% range when tested as a reverse osmosis membrane (60 psi, 500 PPM NaCl, 10% recovery, 25° C.). The nominal molecular weight cut-off of the membrane may be 100 daltons. The membranes may be made from a hydrophilic membrane material, for example, cellulose acetate, cellulose proprionate, cellulose butyrate, cellulose diacetate, blends of cellulosic materials, polyurethane, polyamides. The membranes may be asymmetric (that is the membrane has a thin rejection layer on the order of 10 microns thick and a porous sublayer up to 300 microns thick) and may be formed by an immersion precipitation process. The membranes are either unbacked, or have a very open backing that does not impede water reaching the rejection layer, or are hydrophilic and easily wick water to the membrane. Thus, for mechanical strength they may be cast upon a hydrophobic porous sheet backing, wherein the porous sheet is either woven or non-woven but having at least about 30% open area. The woven backing sheet is a polyester screen having a total thickness of about 65 microns (polyester screen) and total asymmetric membrane is 165 microns in thickness. The asymmetric membrane may be cast by an immersion precipitation process by casting a cellulose material onto a polyester screen. The polyester screen may be 65 microns thick, 55% open area.

For the exemplary purposes of this disclosure, osmotic agents may generally be inorganic salt based or sugar-based. For example, an osmotic agent may be Sodium chloride=6.21 wt %, Potassium chloride=7.92 wt %, Trisodium citrate=10.41 wt %, Glucose=58.24 wt %, and Fructose=17.22 wt %. Other osmotic agents (or hydration formulations) include, for example, medicines within a dextrose formulation, dehydrated foods, and any other solute that can be hydrated with water.

A sugar-based osmotic agent can be powders or syrups made from the following: fructose, sucrose, glucose, sodium citrate, potassium citrate, citric acid, potassium ascorbate, sodium ascorbate, ascorbic acid, water soluble vitamins, sodium chloride, and potassium chloride. For example, a mixture of 60% fructose, 10% potassium citrate, 10% sodium citrate and 20% water was tested in the 30 cm element and had performance similar to 80% fructose-20% water nutrient syrup.

Various osmotic pump and FO system implementations may be manufactured using conventional procedures as added to and improved upon through the procedures described here. Some components defining an osmotic pump and FO system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener, wiring, any combination thereof, and/or the like for example, depending on, among other considerations, the particular material forming the components.

For the exemplary purposes of this disclosure, in one implementation a process for making a spiral wound membranes for both the filter and osmotic pump elements may include: (a) assembling an envelope sandwich; (b) assembling a center tube onto the envelope sandwich; and (c) wrapping the envelope sandwich having the center tube and glue to form the spiral wound membrane module.

USE

Implementations of an osmotic pump and FO system are particularly useful in FO/water treatment applications as previously explained. However, implementations are not limited to uses relating to FO applications. Rather, any description relating to FO applications is for the exemplary purposes of this disclosure, and implementations may also be used with similar results in a variety of other applications. For example, osmotic pump and FO system implementations may also be used for pressure retarded osmosis systems. The difference is that pressure retarded osmosis generates osmotic pressure to drive a turbine or other energy-generating device. All that would be needed is to switch to feeding fresh water into the center tube (as opposed to OA as described herein) and the salt water feed can be fed to the outside instead of source water (for water treatment applications).

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A self-regulating forward osmosis (FO) system comprising:
   (a) a container containing a source water supply;
   (b) a FO membrane element located within the container comprising an area of osmotic membranes, an osmotic agent inlet and a drink outlet;
   (c) an osmotic pump element located within the container comprising an area of osmotic membranes, an osmotic agent inlet and a drink outlet; and
   (d) an osmotic agent tank located above the container comprising a feed tube connected to an outlet located on the bottom of the osmotic agent tank, the feed tube in fluid communication with the osmotic agent inlet of the FO membrane element and the osmotic agent inlet of the osmotic pump element;
   whereby the osmotic pump element regulates osmotic agent flow rates into the FO membrane element by creating a density gradient within the osmotic agent tank.

2. The self-regulating FO system of claim 1, wherein the osmotic agent is a syrup having a specific gravity of approximately 1.3.

3. The self-regulating FO system of claim 1, wherein the FO membrane element is in the form of one or a plurality of spiral wound elements.

4. The self-regulating FO system of claim 1, wherein the osmotic pump element is in the form of one or a plurality of spiral wound elements.

5. The self-regulating FO system of claim 1, wherein a total surface area of osmotic membrane in the osmotic pump element is from about 1% to about 20% of a total surface area of osmotic membrane in the FO membrane element.

6. The self-regulating FO system of claim 1, wherein the osmotic agent tank comprises a releasable top having a port thereon.

7. The self-regulating FO system of claim 1 further comprising a return tube in fluid communication with the drink outlet of the osmotic pump element and a port near a top of the osmotic agent tank.

8. The self-regulating FO system of claim 1, wherein the feed tube is in fluid communication with a "T" connector that splits the feed tube into two branches, a first branch in fluid communication with the osmotic agent inlet of the FO membrane element and a second branch in fluid communication with the osmotic agent inlet of the osmotic pump element.

9. The self-regulating FO system of claim 1 further comprising a collection tank configured to receive discharge dilute drink comprising an drink inlet in fluid communication with the drink outlet of the FO membrane element.

10. A self-regulating forward osmosis (FO) system comprising:
(a) a container containing a source water supply;
(b) a FO membrane element located within the container comprising an area of osmotic membranes, an osmotic agent inlet and a drink outlet;
(c) an osmotic pump element located within the container comprising an area of osmotic membranes, an osmotic agent inlet and a drink outlet; and
(d) an osmotic agent tank located above the container comprising a feed tube connected to an outlet located on the bottom of the osmotic agent tank, the feed tube comprising a first branch in fluid communication with the osmotic agent inlet of the FO membrane element and a second branch in fluid communication with the osmotic agent inlet of the osmotic pump element;
(e) a collection tank configured to receive discharge dilute drink comprising a drink inlet in fluid communication with the drink outlet of the FO membrane element;
(F) a return tube in fluid communication with the drink outlet of the osmotic pump element and a port near a top of the osmotic agent tank; and
whereby the osmotic pump element regulates osmotic agent flow rates into the FO membrane element by creating a density gradient within the osmotic agent tank.

11. The self-regulating FO system of claim 10, wherein the osmotic agent is a syrup having a specific gravity of approximately 1.3.

12. The self-regulating FO system of claim 10, wherein the FO membrane element is in the form of one or a plurality of spiral wound elements.

13. The self-regulating FO system of claim 10, wherein the osmotic pump element is in the form of one or a plurality of spiral wound elements.

14. The self-regulating FO system of claim 10, wherein a total surface area of osmotic membrane in the osmotic pump element is from about 1% to about 20% of a total surface area of osmotic membrane in the FO membrane element.

15. The self-regulating FO system of claim 10, wherein the osmotic agent tank comprises a releasable top having a port thereon.

16. A process for controlling osmotic agent flow into a forward osmosis (FO) membrane element so as to control for variability of operating temperature, source water quality and age of the FO membrane element, comprising:
providing a self-regulating FO system comprising: (a) a container containing a source water supply; (b) a FO membrane element located within the container comprising an area of osmotic membranes, an osmotic agent inlet and a drink outlet; (c) an osmotic pump element located within the container comprising an area of osmotic membranes, an osmotic agent inlet and a drink outlet; and (d) an osmotic agent tank located above the container comprising a feed tube connected to an outlet located on the bottom of the osmotic agent tank, the feed tube in fluid communication with the osmotic agent inlet of the FO membrane element and the osmotic agent inlet of the osmotic pump element; whereby the osmotic pump element regulates osmotic agent flow rates into the FO membrane element by creating a density gradient within the osmotic agent tank;
adding components of an osmotic agent to the osmotic agent tank and source water to the container; and
obtaining drink of consistent strength over varying ranges of temperature, source water quality and age of membranes.

17. The process of claim 16, wherein the step of providing a self-regulating FO system further comprises providing osmotic agent as a syrup having a specific gravity of approximately 1.3.

18. The process of claim 16, wherein the step of providing a self-regulating FO system further comprises providing a total surface area of osmotic membrane in the osmotic pump element that is from about 1% to about 20% of a total surface area of osmotic membrane in the FO membrane element.

19. The process of claim 16 wherein the step of providing a self-regulating FO system further comprises providing a return tube in fluid communication with the drink outlet of the osmotic pump element and a port near a top of the osmotic agent tank.

20. The process of claim 16 wherein the step of providing a self-regulating FO system further comprises providing a collection tank configured to receive discharge dilute drink comprising an drink inlet in fluid communication with the drink outlet of the FO membrane element.

* * * * *